(12) United States Patent
Ozawa et al.

(10) Patent No.: US 8,174,228 B2
(45) Date of Patent: May 8, 2012

(54) MOTOR CONTROL DEVICE

(75) Inventors: Tomoaki Ozawa, Nagoya (JP);
Takahiro Tsuchiya, Anjo (JP); Yo Kawakami, Kariya (JP); Masayuki Arai, Toyota (JP)

(73) Assignees: Aisin Seiki Kabushiki Kaisha, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 362 days.

(21) Appl. No.: 12/491,629

(22) Filed: Jun. 25, 2009

(65) Prior Publication Data

US 2009/0322272 A1 Dec. 31, 2009

(30) Foreign Application Priority Data

Jun. 26, 2008 (JP) ................... 2008-166889

(51) Int. Cl.
*H02P 7/00* (2006.01)
*H02H 5/04* (2006.01)

(52) U.S. Cl. ........... 318/473; 318/445; 318/471; 361/24

(58) Field of Classification Search ................ 318/445, 318/471, 473; 361/24
See application file for complete search history.

(56) References Cited

U.S. PATENT DOCUMENTS

| | | | | |
|---|---|---|---|---|
| 5,601,063 A * | 2/1997 | Ohashi et al. | ................. | 123/396 |
| 6,016,965 A * | 1/2000 | Yoshimura et al. | ............. | 236/35 |
| 6,268,986 B1 * | 7/2001 | Kobayashi et al. | ............. | 361/24 |
| 6,330,498 B2 * | 12/2001 | Tamagawa et al. | ............. | 701/22 |
| 6,352,055 B1 * | 3/2002 | Algrain et al. | ............. | 123/41.44 |
| 6,453,865 B2 * | 9/2002 | Hirose et al. | ................ | 123/179.4 |
| 6,653,807 B2 * | 11/2003 | Saito et al. | ..................... | 318/430 |
| 6,927,549 B2 * | 8/2005 | Ashiya et al. | ................. | 318/471 |
| 7,248,009 B1 * | 7/2007 | Sundquist | ..................... | 318/434 |
| 7,304,447 B2 | 12/2007 | Hirai et al. | | |
| 7,321,213 B2 * | 1/2008 | Kobayashi et al. | ........... | 318/471 |
| 2008/0115997 A1 | 5/2008 | Banno | | |

FOREIGN PATENT DOCUMENTS

| | | |
|---|---|---|
| JP | 61-173692 U | 10/1986 |
| JP | 8-275598 A | 10/1996 |
| JP | 9-215388 A | 8/1997 |
| JP | 2003-289694 A | 10/2003 |
| JP | 2007-043835 A | 2/2007 |
| WO | 03/047950 A1 | 6/2003 |

OTHER PUBLICATIONS

Japanese Office Action dated Mar. 16, 2010 (with translation) (5 pages).

* cited by examiner

*Primary Examiner* — Walter Benson
*Assistant Examiner* — Gabriel Agared
(74) *Attorney, Agent, or Firm* — Sughrue Mion, PLLC

(57) ABSTRACT

A motor control device includes a motor, a control portion controlling the motor, estimating a heating temperature of the motor on the basis of an electric current value and an energizing time period or a stopping time period of the motor, and restricting an electrification of the motor in a case where the estimated heating temperature becomes equal to or greater than a limit value, and a temperature sensing device for detecting a temperature of a predetermined portion of a vehicle, wherein the control portion estimates an initial temperature of the motor when an engine is started on the basis of a temperature signal outputted from the temperature sensing device and determines the limit value on the basis of the estimated initial temperature.

8 Claims, 5 Drawing Sheets

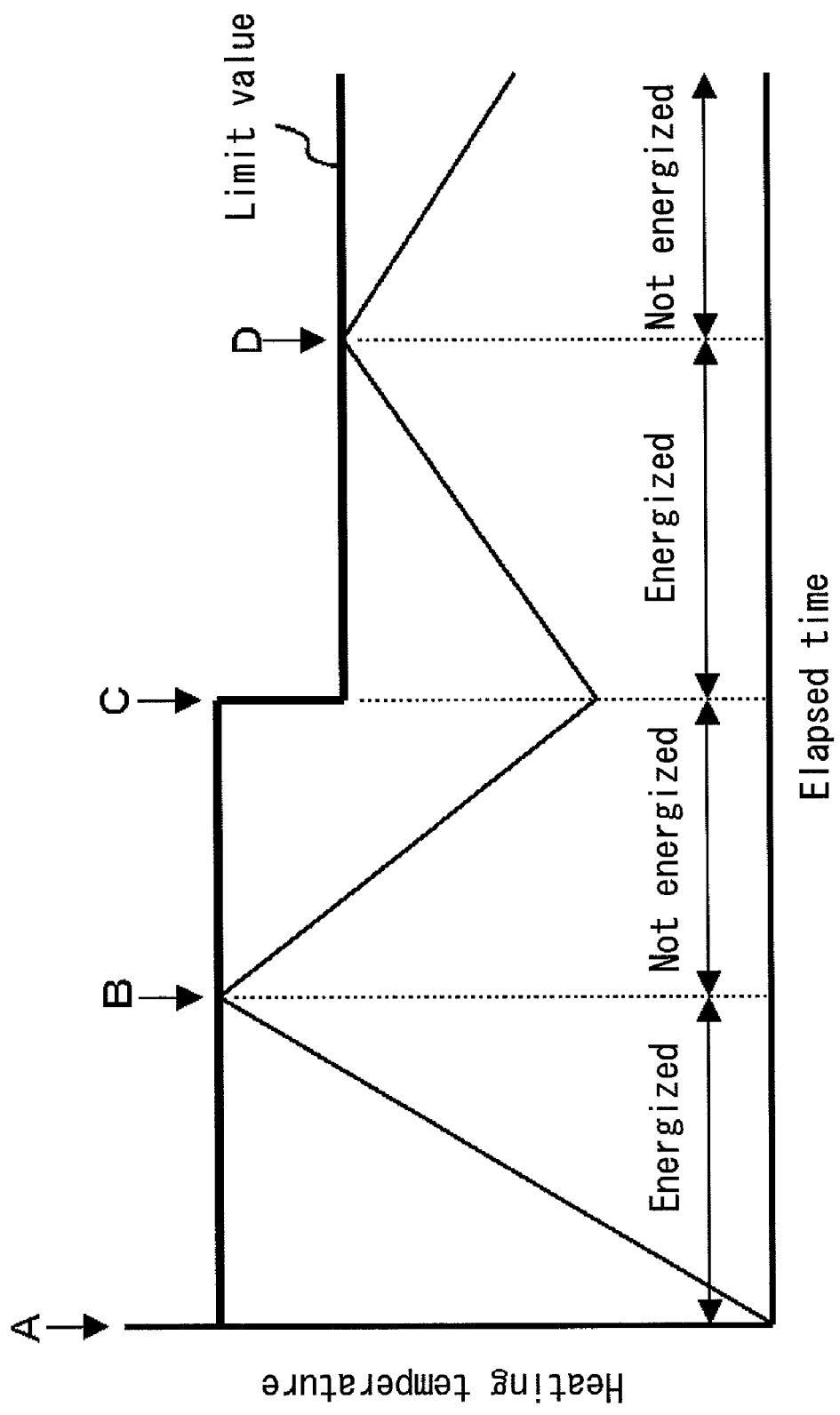

US 8,174,228 B2

MOTOR CONTROL DEVICE

CROSS REFERENCE TO RELATED APPLICATIONS

This application is based on and claims priority under 35 U.S.C. §119 to Japanese Patent Application 2008-166889, filed on Jun. 26, 2008 the entire content of which is incorporated herein by reference.

TECHNICAL FIELD

The present invention generally relates to a motor control device for controlling a motor.

BACKGROUND

In a case where a motor is locked while the motor for driving a mechanism, such as a slide mechanism, a lift mechanism and the like, is being energized, an excessive electric current may flow through the motor, which may result in a burnout of the motor. In order to prevent the motor from being burned, i.e. in order to protect the motor, for example, the following devices are provided.

Disclosed in JP2003-289694A is a drive switching device, in which a motor current flowing through a motor and a time period for the motor being energized (i.e. an energizing time) since the motor has started are detected, so that a heating temperature of the motor is estimated on the basis of the motor current and the energizing time. According to the drive switching device disclosed in JP2003-289694A, electrification of the motor is restricted (i.e. operation input via an operation switch is allowed or prohibited) on the basis of the estimated heating temperature.

Disclosed in JP2007-43835A is a motor controller, which calculates an estimated temperature of a motor, memorizes the calculated estimated temperature and calculates a temperature increasing value of the estimated temperature on the basis of an operating condition of the motor while being energized in order to update the estimated temperature by adding the calculated temperature increasing value to the memorized estimated temperature. In a case where the updated estimated temperature exceeds a predetermined temperature, a burning protection of the motor is executed. In the calculation of the temperature increasing value, plural temperature increasing values are calculated by using plural temperature increase estimating equations and the greatest temperature increasing value among the calculated temperature increasing values is selected as the most appropriate temperature increasing value.

According to the drive switching device disclosed in JP2003-289694A and the motor controller disclosed in JP2007-43835A, the temperature of the motor is estimated on the basis of the energizing time, the electric current and the like, so that the electrification of the motor is restricted in the case where the estimated temperature exceeds a preliminarily set limit value (a predetermined temperature). According to the drive switching device disclosed in JP2003-289694A and the motor controller disclosed in JP2007-43835A, the same limit value is used for both a case where the motor is used under a low-temperature environment and a case where the motor is used under a high-temperature environment. In order to ensure a safety of the motor, the limit value is set in consideration of the high-temperature environment. Therefore, in a case where the limit value, which is set in the consideration of the high-temperature environment, is used for the motor, which is used under the low-temperature environment, the electrification of the motor is restricted even at a condition well below a burnout of the motor actually occurs, and full advantage of the motor may not be used.

A need thus exists to provide a motor control device which is not susceptible to the drawback mentioned above.

SUMMARY OF THE INVENTION

According to an aspect of the present invention, a motor control device includes a motor, a control portion controlling the motor, estimating a heating temperature of the motor on the basis of an electric current value and an energizing time period or a stopping time period of the motor, and restricting an electrification of the motor in a case where the estimated heating temperature becomes equal to or greater than a limit value; and a temperature sensing for detecting a temperature of a predetermined portion of a vehicle, wherein the control portion estimates an initial temperature of the motor (21) when an engine (92) is started on the basis of a temperature signal outputted from the temperature sensing device and determines the limit value on the basis of the estimated initial temperature.

BRIEF DESCRIPTION OF THE DRAWINGS

The foregoing and additional features and characteristics of the present invention will become more apparent from the following detailed description considered with the reference to the accompanying drawings, wherein:

FIG. 5 is a diagram schematically graphing a condition of the motor when being energized and when not being energized according to the embodiment.

DETAILED DESCRIPTION

Figure 1:
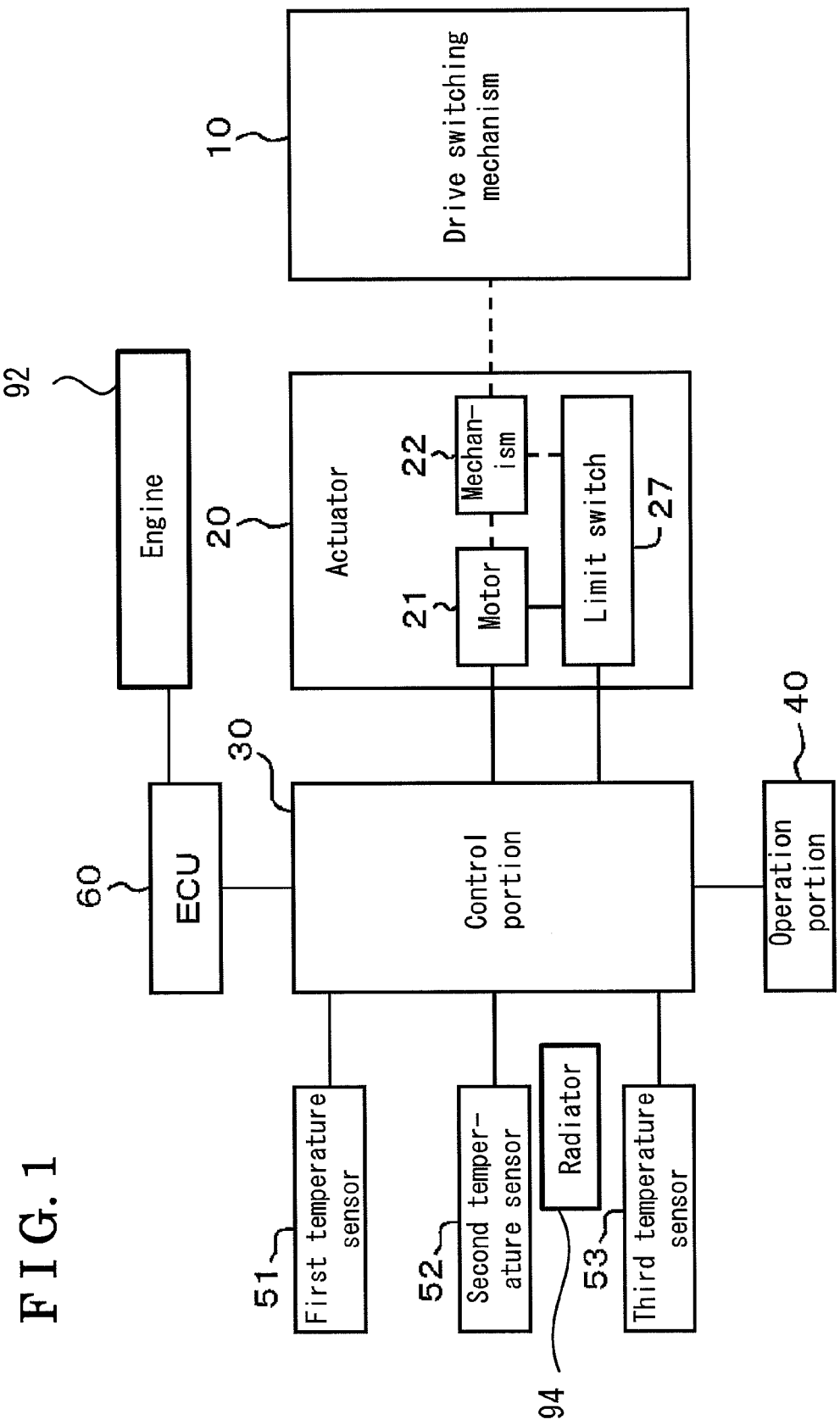
FIG. 1 is a block diagram schematically illustrating a configuration example of a drive switching device, which is adapted to a motor control device according to an embodiment.
Figure 2:
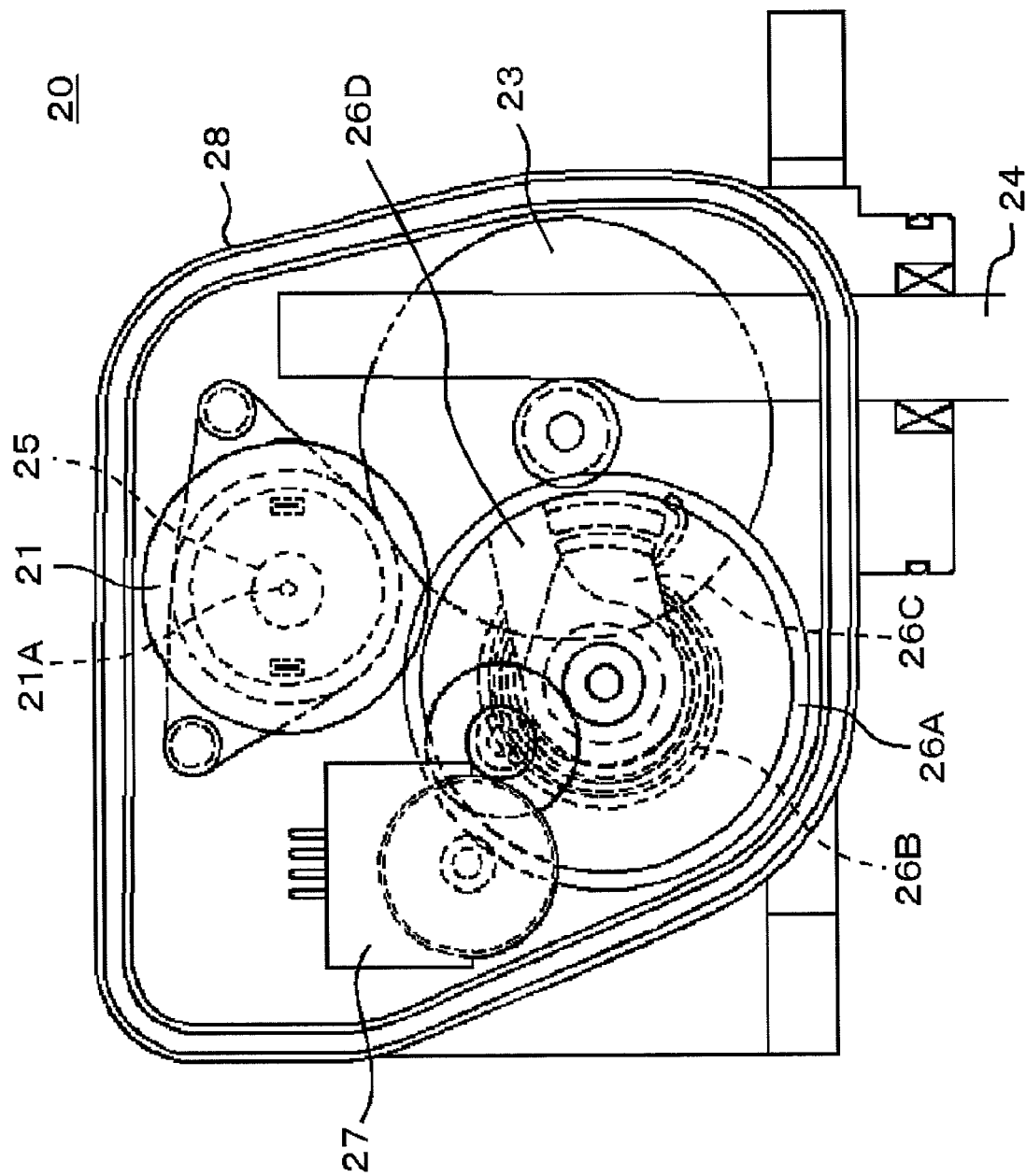
FIG. 2 is a diagram schematically illustrating a configuration example of an actuator including a motor, which is controlled by the motor control device according to the embodiment.
Figure 3:
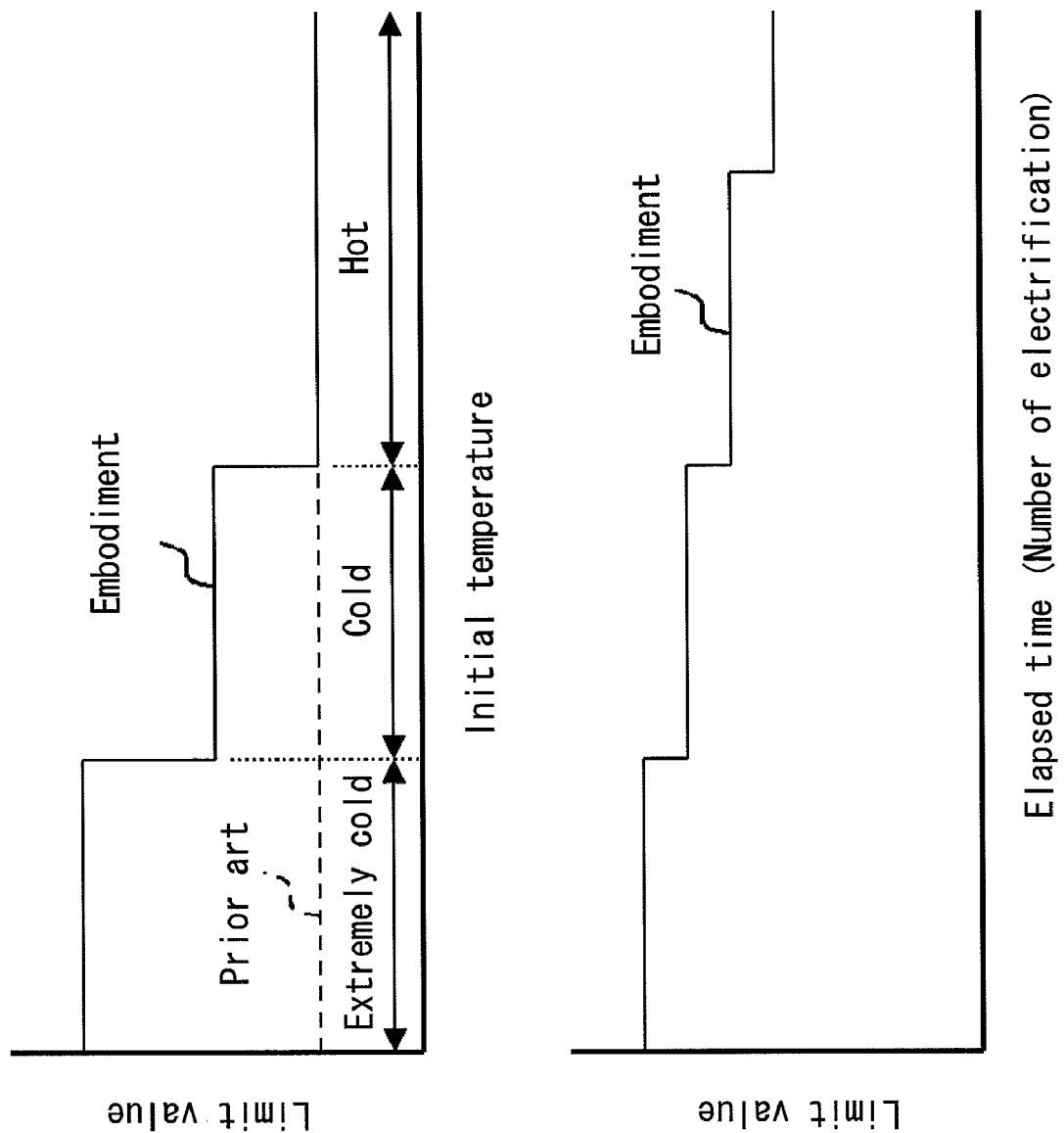
FIG. 3 is a diagram indicating a relationship between a limit value and an initial temperature used in the motor control device according to the embodiment.

A motor control device according to an embodiment will be described below with reference to the attached drawings. Illustrated in FIG. 1 is a block diagram schematically illustrating a configuration example of a drive switching mechanism, to which the motor control device according to the embodiment is adapted. Illustrated in FIG. 2 is a diagram schematically illustrating a configuration example of an actuator including a motor, which is controlled by the motor control device according to the embodiment. Illustrated in FIG. 3 is a diagram indicating a relationship between an initial temperature of the motor and a limit value (a reference value, a threshold value) used for the motor control device according to the embodiment.

As illustrated in FIG. 1, the motor control device controls a motor 21, which is provided within an actuator 20 that executes a switching operation of a drive switching mechanism 10. The motor control device includes the actuator 20, a control portion 30, an operation portion 40 and first, second and third temperature sensors 51, 52 and 53 (a temperature sensing device).

The drive switching mechanism 10 is a mechanism for switching a driving condition of a vehicle 90. The drive switching mechanism 10 is configured so as to switch the driving condition either to a two-wheel drive, a four-wheel drive in which a differential is locked or a four-wheel drive in which the differential is not locked by an operation of the actuator 20. A known drive switching mechanism, for example the drive switching mechanism disclosed in JP2003-289694A, may be used as the drive switching mechanism 10.

The actuator 20 executes the switching operation of the drive switching mechanism 10 via a mechanism 22 by driving the motor 21 on the basis of a control command outputted from the control portion 30 (see FIG. 1). The actuator 20 includes the motor 21, an output mechanism 23, a rod 24, a cycloid gear 25, a rotation absorbing mechanism (26A, 26B, 26C and 26D), and a limit switch 27 within a housing 28 (see FIG. 2). The output mechanism 23, the rod 24, the cycloid gear 25 and the rotation absorbing mechanism (26A, 26B, 26C and 26D) serve as the mechanism 22.

The motor 21 outputs a rotational torque, which is outputted from an output shaft 21A, on the basis of the control command of the control portion 30. The output mechanism 23 is a mechanism for converting the rotational torque, outputted from the output shaft 21A of the motor 21, into a thrust force in an axial direction, i.e. in a direction orthogonal to the output shaft 21A, and for outputting the converted thrust force. The rod 24 serves as an output member, which is formed in a stick shape and which is displaced in an axial direction thereof in response to the thrust force, which is generated in response to the rotational torque of the motor 21 and which is transmitted to the rod 24 via the output mechanism 23. The cycloid gear 25 is provided between the output shaft 21A of the motor 21 and the output mechanism 23. Furthermore, the cycloid gear 25 serves as a reverse-rotation restricting mechanism for restricting a reverse rotation of the output shaft 21A caused by a power, which is transmitted from the rod 24 (the output mechanism 23) to the output shaft 21A. Additionally, a worm gear may be used as the reverse-rotation restricting mechanism instead of the cycloid gear 25. The rotation absorbing mechanism (26A, 26B, 26C and 26D) is provided between the cycloid gear 25 and the output mechanism 23. Furthermore, the rotation absorbing mechanism (26A, 26B, 26C and 26D) is a mechanism that absorbs the rotational torque of the motor 21 in a case where the rod 24 becomes incapable of performing a reciprocating motion while the motor 21 rotates. The limit switch 27 serves as a switch (a sensor) for detecting a rotational angle of the output shaft 21A of the motor 21. Furthermore, the limit switch 27 is provided between the rotation absorbing mechanism (26A, 26B, 26C and 26D) and the output shaft 21A. Additionally, the limit switch 27 is electrically connected to the control portion 30.

The rotation absorbing mechanism includes a motor-side rotational member 26A, a spiral spring 26B, an output-side rotational member 26C and a plate 26D. The motor-side rotational member 26A is fixed at one end portion of the spiral spring 26B, so that the motor-side rotational member 26A, which serves as a first rotational member, transmits a rotational force of the output shaft 21A of the motor 21, which is inputted to the motor-side rotational member 26A via the cycloid gear 25, to the output-side rotational member 26C via the spiral spring 26B. The spiral spring 26B is fixed to the motor-side rotational member 26A at the one end portion of the spiral spring 26B and is fixed to the output-side rotational member 26C at the other end portion. Furthermore, the spiral spring 26B serves as an elastic member, which is formed in a spiral shape and which is configured so as to be elastically compressed in a rotational direction, which corresponds to a direction in which the motor-side rotational member 26A is rotated by the motor 21. The output-side rotational member 26C is fixed at the other end portion of the spiral spring 26B, so that the output-side rotational member 26C, which serves as a second rotational member, transmits the rotational force, which is inputted thereto from the motor-side rotational member 26A via the spiral spring 26B, to the output mechanism 23. The plate 26D is provided between the motor-side rotational member 26A and the output-side rotational member 26C.

The control portion 30 is a controller that controls the motor 21. The control portion 30 includes a computing function for executing a data processing on the basis of a predetermined program. The control portion 30 is electrically connected to the limit switch 27 and the operation portion 40, so that a status signal from the limit switch 27 and a switch signal from the operation portion 40 are inputted into the control portion 30. The control portion 30 executes an energization control (i.e. an energization (an electrification) of the motor 21 so as to rotate in a positive direction or in a reverse direction) on the basis of the inputted signals.

Further, the control portion 30 includes a function for restricting the electrification of the motor 21 (i.e. an electrification amount supplied to the motor 21) in order to avoid the motor 21 from heating excessively (overheating) (i.e. an electrification restricting function). According to the electrification restricting function of the control portion 30, the control portion 30 estimates an initial temperature of the motor 21 (i.e. temperature of the motor 21 (motor temperature) when an engine 92 is started) on the basis of temperature signal outputted from one of or more of the first, second and third temperature sensors 51, 52 and 53 when the engine 92 is started. Then, the control portion 30 determines the limit value in response to the estimated initial temperature (e.g. a limit value in a case where the estimated motor temperature is extremely cold, a limit value in a case where the estimated motor temperature is cold, or a limit value in a case where the estimated motor temperature is hot) (see upper graph in FIG. 3). Further, the control portion 30 estimates a heating temperature of the motor 21 on the basis of an electric current value and an energizing time period (i.e. a time period during which the motor 21 is being energized) or a stopping time period (i.e. a time period during which the motor 21 is stopped) of the motor 21, so that the control portion 30 restricts the electrification of the motor 21 in a case where the estimated heating temperature becomes equal to or greater than the determined limit value. Additionally, in this embodiment, the limit value is set so as to stepwisely decrease in response to the initial temperature in a manner where in a case where the initial temperature is relatively low, the limit value is determined to be relatively high, on the other hand, in a case where the initial temperature is relatively high, the limit value is determined to be relatively low when comparing to the case where the initial temperature is low. More specifically, according to the electrification restricting function of the control portion 30, the control portion 30 changes (determines) the limit value to the limit value for the extremely cold temperature, the limit value for the cold temperature and to the limit value for the hot temperature (so that the limit value becomes lower) in response to an elapsed time or number of times when the motor 21 is electrified (i.e. a number of electrifications) (see a lower graph in FIG. 3), because the temperature of the motor 21 increases by repeating the electrification of the motor 21 or an atmospheric temperature of the vehicle, so that the control portion 30 restricts the electrification of the motor 21 in a case where the estimated heating temperature becomes equal to or greater than the limit value. The detailed description about a structure and an operation of the control portion 30 will be given below.

The operation portion 40 is a switch, which is manually operated in order to switch the driving condition of the vehicle 90 among the two-wheel drive, the four-wheel drive in which the differential is locked and the four-wheel drive in which the differential is not locked. Furthermore, the operation portion 40 outputs the switch signal to the control portion 30.

The first temperature sensor 51 is a temperature sensor for detecting the ambient temperature outside the vehicle 90. Further, the first temperature sensor 51 outputs the temperature signal to the control portion 30.

The second temperature sensor 52 is a temperature sensor for detecting a coolant temperature of the engine 92 of the vehicle 90, more specifically, a temperature of coolant (cooling water) passing through a radiator 94. Further, the second temperature sensor 52 outputs the temperature signal to the control portion 30.

The third temperature sensor 53 is a temperature sensor for detecting a temperature of the actuator 20. Further, the third temperature sensor 53 outputs the temperature signal to the control portion 30.

Additionally, in this embodiment, three temperature sensors (51, 52 and 53) are provided to the motor control device. However, the present invention is not limited to this configuration, but any desired number of the temperature sensors may be provided to the motor control device, as long as at least one temperature sensor is provided to the motor control device.

An engine control unit 60 (which will be hereinafter referred to as an ECU 60) is a device that controls the engine 92. The ECU 60 includes a function of counting a time period between when the engine 92 is stopped and when the engine 92 is started again (i.e. a soak time). Furthermore, the ECU 60 outputs information relating to the soak time to the control portion 30 when the engine 92 is started (i.e. when the system is started).

Figure 4:
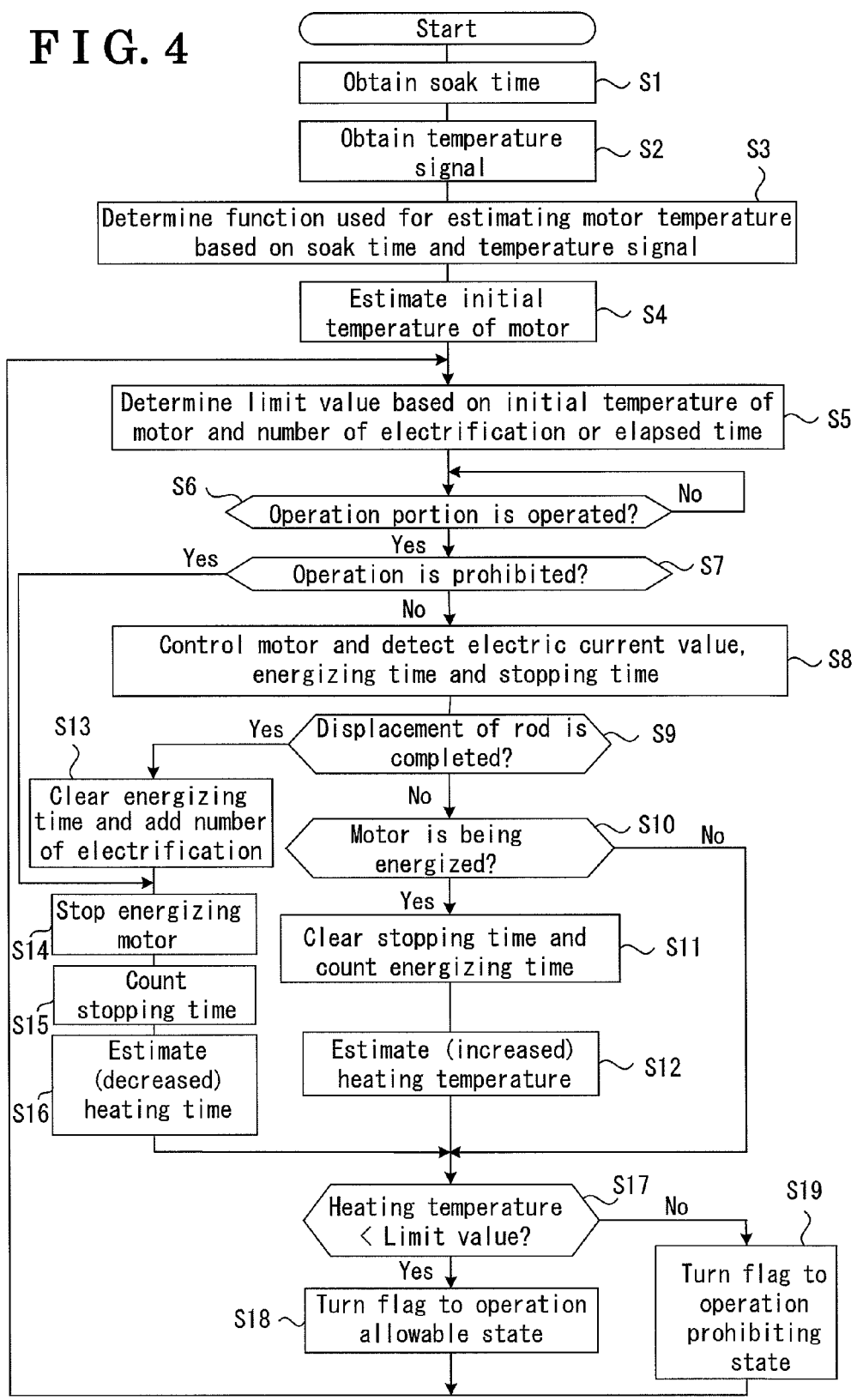
FIG. 4 is a flowchart illustrating a motor control operation, which is executed by a control portion in the motor control device according to the embodiment.

The operation of the motor control device according to the embodiment will be described below. Illustrated in FIG. 4 is a flowchart of an example of a motor control operation executed at the control portion 30 of the motor control device according to the embodiment. Illustrated in FIG. 5 is a diagram schematically graphing a condition of the motor when being energized and when not being energized. Each component of the motor control device is illustrated in FIGS. 1 and 2.

Referring to FIG. 4, the control portion 30 obtains the information relating to the time period between when the engine 92 is stopped and the engine 92 is started again (the soak time) from the ECU 60 when a power source is turned on (i.e. when an ignition switch is turned on) (step S1). Additionally, in this embodiment, the control portion 30 turns a flag, which indicates an operation state of the operation portion 40, to be in an operation allowable state, because the motor 21 does not heat up immediately after the engine 92 is started.

Following step S1, the control portion 30 obtains the temperature signals from the first, second and third temperature sensors 51, 52 and 53 (step S2). In step S2, in a case where all of the first, second and third temperature sensors 51, 52 and 53 operate normally, all of the temperature signals outputted therefrom are obtained. On the other hand, in a case a malfunction or failure occurs at any one or two of the first, second and third temperature sensors 51, 52 and 53, the control portion 30 obtains the temperature signal(s) outputted from the first, second or third temperature signals 51, 52 or 53 that operate(s) normally.

Following step S2, the control portion 30 determines a function, which is used for estimating the motor temperature, on the basis of the obtained soak time and the temperature signals (the valid temperature signal(s), i.e. the temperature signal(s) obtained from the temperature sensor(s) that operate(s) normally) (step S3).

In the determination of the function used for estimating the motor temperature, for example, in a case where the soak time is equal to or greater than a predetermined value, a function (plural functions) indicative of a soak state (i.e. a state where the engine 92 is started after the engine 92 is stopped for a relatively long time (a cold start)) is selected. On the other hand, in a case where the soak time is less than the predetermined value, a function (plural functions) indicative of a warm up state (i.e. a state where the engine 92 is warmed up) is selected. Ultimately, one of the functions indicative of the soak state is determined on the basis of the valid temperature signal(s) in the case where the soak time is equal to or greater than the predetermined value. Similarly, one of the functions indicative of the warm up state is determined on the basis of the valid temperature signal(s) in the case where the soak time is less than the predetermined value. There exist plural functions for the soak state corresponding to the valid temperature signal(s). Similarly, there exist plural functions for the warm up state corresponding to the valid temperature signal(s).

Following step S3, the control portion 30 estimates the initial temperature of the motor 21 on the basis of the determined function used for estimating the motor temperature (step S4). The initial temperature refers to a temperature of the motor 21 when the engine 92 is started (when the system is started).

Following step S4, step S18 or step S19, the control portion 30 determines the limit value on the basis of the estimated initial temperature and the number of electrifications or the elapsed time, which are counted by the control portion 30 (step S5). For example, an initial limit value is determined at time A in FIG. 5 in this embodiment. The next limit value is determined at time C in FIG. 5. The number of electrifications of the motor 21 in the state where the motor 21 is not driven immediately after the engine 92 is started, is indicated by zero (0) (i.e. the number of electrifications=0). The elapsed time refers to a time passed since the engine 92 has started.

In the determination of the initial limit value, in a case where, for example, the estimated initial temperature of the motor 21 is considered to be extremely cold (e.g. less than minus 20 degree Celsius (−20° C.)), a limit value for the extremely cold temperature is used. On the other hand, in a case where the estimated initial temperature is considered to be cold (e.g. a range between minus 20 degree Celsius to 20 degree Celsius (−20° C. to +20° C.)), a limit value for the cold temperature (a limit value less than the limit value for the extremely cold temperature) is used. Furthermore, in a case where the estimated initial temperature is considered to be hot (greater than 20 degree Celsius (more than +20° C.)), a limit value for the hot temperature (a limit value less than the cold temperature) is used (see the upper graph in FIG. 3). On the other hand, in the determination of the limit value other than the initial limit value, for example, because the temperature of the motor 21 increases due to repeating of electrification of the motor 21 and the atmospheric temperature of the vehicle, therefore, even in the case where the initial limit value is determined to be the limit value for the extremely cold temperature, the limit value is changed (determined) to be a value closer to the limit value for the hot temperature (i.e. so that the limit value is determined to be lower) in a case where the elapsed time becomes equal to or greater than a predetermined time or in a case where the number of electrifications becomes equal to or greater than a predetermined number of times, (see the bottom graph in FIG. 3). Accordingly, the motor 21 properly and surely protected. In this embodiment, three different limit values are set in response to the initial temperature of the motor 21. However, the present invention is not limited to this configuration. For example, any desired number of limit values may be set in response to the initial temperature of the motor 21. Furthermore, the temperature range indicates in this embodiment is only one example. Therefore, the temperature range may be modified and various temperature ranges may be set in response to practical uses.

Following step S5, the control portion 30 determines whether or not the operation portion 40 is operated (step S6). In step S6, the control portion 30 determines whether the vehicle 90 is in the two-wheel drive state, the four-wheel drive state where the differential is locked or the four-wheel drive state where the differential is not locked. In a case where the operation portion 40 is not operated (No in step S6), the process returns to the step S6.

In a case where the operation portion 40 is operated (Yes in step S6), the control portion 30 determines whether or not the flag is turned to be in an operation prohibiting state (step S7). In a case where the flag is in the operation prohibiting state (Yes in step S7), the process proceeds to step S14.

On the other hand, in a case where the flag is not in the operation prohibiting state (No in step S7), the control portion 30 controls the motor 21 in response to the operational condition of the operation portion 40, and detects the electric current value, the energizing time period and the stopping time period of the motor 21 (step S8). The control portion 30 counts the elapsed time since the motor 21 has started while the control portion 30 controls the motor 21.

Following step S8, the control portion 30 determines whether or not displacement of the rod 24 (see FIG. 2) in response to a control state of the motor 21 is completed (step S9). In a case where the displacement of the rod 24 is completed (Yes in step S9), the process proceeds to step S13.

On the other hand, in a case where the displacement of the rod 24 is not completed (No in step S9), the control portion 30 determines whether or not the motor 21 is being energized (i.e. whether or not the electrification of the motor 21 is being executed) (step S10). In the case where the motor 21 is not being energized (No in step S10), the process proceeds to step S17.

On the other hand, in the case where the motor 21 is being energized (Yes in step S10), the control portion 30 clears the stopping time period of the motor 21 (i.e. the control portion 30 resets the stopping time period of the motor 21 to zero (0)) and starts counting the energizing time period of the motor 21 (step S11).

Following step S11, the control portion 30 estimates the heating temperature of the motor 21 which tends to increase (which will be hereinafter referred to as an increased heating temperature of the motor 21) on the basis of the detected electric current value and the counted energizing time period of the motor 21 (step S12). The heating temperature of the motor 21 is estimated in a manner where: a rise coefficient is obtained by substituting the electric current value and the energizing time period into functions, which are preliminarily and experimentally obtained and which is indicative of temperature rise, and then, the obtained rise coefficient is added to the heating temperature, which is previously obtained (i.e. the hearing temperature which is obtained in one previous control cycle of the motor control operation), for example the initial temperature in a case where the heating temperature of the motor 21 is estimated for the first time). Following step S12, the process proceeds to step S17. Additionally, the rise coefficient may be calculated on the basis of the electric current value in a predetermined cycle.

In the case where the displacement of the rod 24 is completed (Yes in step S9), the control portion 30 clears the energizing time period of the motor 21 (i.e. the control portion 30 resets the energizing time period to zero (0)) (step S13).

Following step S13, or in the case where the flag is in the process prohibiting state (Yes in step S7), the control portion 30 turns the motor 21 to the non-energized state (i.e. the control portion 30 stops the electrification of the motor 21) (Step S14).

Following step S14, the control portion 30 counts the stopping time period of the motor 21 (step S15).

Following step S15, the control portion 30 estimates the temperature of the motor 21, which is considered to decrease (i.e. the temperature of the motor 21 which tends to decrease (which will be hereinafter referred to as the decreased heating temperature of the motor 21)), on the basis of the detected electric current value and the counted stopping time period of the motor 21 (step S16). The decreased heating temperature of the motor 21 is estimated in a manner where: a temperature reduction value, which is preliminarily and experimentally calculated, is obtained, and then, the temperature reduction value is subtracted from the heating temperature, which is previously estimated (i.e. which is estimated in one previous control cycle of the motor control operation). Then, the process proceeds to step S17.

In the case where the motor 21 is not being energized (No in step S10), following step S12 or following step S16, the control portion 30 determines whether or not the estimated heating temperature of the motor 21 is less than the determined limit value (step S17). In a case where the estimated heating temperature is not less than the limit value (i.e. in the case where the estimated heating temperature is equal to or greater than the limit value: No in step S17), the process proceeds to step S19.

On the other hand, in a case where the estimated heating temperature is less than the limit value (Yes in step S17), the control portion 30 turns the flag to the operation allowable state (step S18). For example, in the case where the heating temperature is less than the limit value, as illustrated between time A and time B in FIG. 5, the flag is turned to the operation allowable state (i.e. an electrification allowable state). Then, the process returns to step S5.

In the case where the estimated heating temperature of the motor 21 is not less than the limit value (i.e. in the case where the estimated heating temperature is equal to or greater than the limit value: No in step S17), the control portion 30 turns the flag to the operation prohibiting state (step S19). For example, when the heating temperature reaches the limit value, as illustrated between time B and time D in FIG. 5, the flag is turned to the operation prohibiting state (i.e. an electrification prohibiting state). Then, the process returns to the step S5. In the above-descried embodiment, the initial temperature of the motor 21 is estimated on the basis of the soak time (i.e. the time period between when the engine 92 is stopped and when the engine 92 is started again) and the temperature signal(s). Alternatively, the initial temperature may be estimated on the basis of the detected temperature signal(s) without considering the soak time.

According to the embodiment, the motor function is fully utilized by determining the limit value in response to the estimated initial temperature of the motor 21, i.e. by determining the limit value in response to a capacity of the motor 21 against burnout. Furthermore, the motor 21 is surely protected by determining the limit value so as to change to a value closer to the value for the hot temperature in response to the elapsed time, the number of electrifications or the like. Moreover, by using the temperature signals, which are outputted from the first, second and third temperature sensors 51, 52 and 53 of the vehicle 90, respectively, the initial temperature of the motor 21 is estimated even in a case where a temperature sensor for motor is not provided at the vehicle 90 or in the case where the malfunction occurs at any one or more of the temperature sensors as long as at least one of the temperature sensors operates normally. Accordingly, the motor 21 is surely protected. Further, the temperature sensor(s) does not need to be newly added to the vehicle 90, therefore, costs for the system are reduced.

According to the embodiment, the control portion 30 determines the limit value on the basis of the initial temperature in the manner where the limit value is determined to be the lower value in the case where the initial temperature is high when comparing to the limit value determined when the initial temperature is low.

According to the embodiment, the control portion 30 changes the limit value to decrease in response to at least one of an elapsed time and a number of electrifications of the motor 21 after the engine 92 is started.

According to the embodiment, the temperature sensing device includes plural temperature sensors (51, 52, 53). Further, the control portion 30 estimates the initial temperature on the basis of the temperature signal(s) outputted from the temperature sensor(s), which operates normally, in the case where a malfunction occurs at any one or more, but not all, of the temperature sensors (51, 52, 53).

According to the embodiment, the control portion 30 estimates the initial temperature of the motor 21 on the basis of the soak time, which indicates the time period between when the engine 92 is stopped and when the engine 92 is started again, and the temperature signal.

According to the embodiment, the motor 21 is included in the actuator 20, which executes the switching operation of the drive switching mechanism 10.

According to the embodiment, the drive switching mechanism 10 is a mechanism for switching the driving state of the vehicle 90.

According to the embodiment, the temperature sensing device includes one of the temperature sensor 51 for detecting the ambient temperature outside the vehicle 90, the temperature sensor 52 for detecting the coolant temperature of the engine 92 and the temperature sensor 53 for detecting the temperature of the actuator, which executes the switching operation of the drive switching mechanism 10.

According to the embodiment, plural temperature sensors includes the temperature sensor 51 for detecting the ambient temperature outside the vehicle 90, the temperature sensor 52 for detecting the coolant temperature of the engine 92 and the temperature sensor 53 for detecting the temperature of the actuator, which executes the switching operation of the drive switching mechanism 10.

Accordingly, the motor function is fully utilized by determining the limit value in response to the estimated initial temperature of the motor 21, i.e. by determining the limit value in response to the capacity of the motor 21 against the burnout. Furthermore, the motor 21 is surely protected by determining the limit value so as to change to a value closer to the value for the hot temperature in response to the elapsed time, the number of electrifications or the like.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A motor control device comprising:
a motor;
a control portion controlling the motor, estimating a heating temperature of the motor on the basis of an electric current value and an energizing time period or a stopping time period of the motor, and restricting an electrification of the motor in a case where the estimated heating temperature becomes equal to or greater than a limit value; and
a temperature sensing device for detecting a temperature of a predetermined portion of a vehicle, wherein
the control portion estimates an initial temperature of the motor when an engine is started on the basis of a temperature signal outputted from the temperature sensing device and determines the limit value on the basis of the estimated initial temperature, and wherein
the control portion estimates the initial temperature of the motor on the basis of a soak time, which indicates a time period between when the engine is stopped and when the engine is started again, and the temperature signal.

2. The motor control device according to claim 1, wherein the control portion determines the limit value on the basis of the initial temperature in a manner where the limit value is determined to be a lower value in a case where the initial temperature is high when comparing to the limit value determined when the initial temperature is low.

3. The motor control device according to claim 1, wherein the control portion changes the limit value to decrease in response to at least one of an elapsed time and a number of electrifications of the motor after the engine is started.

4. The motor control device according to claim 1, wherein the temperature sensing device includes a plurality of temperature sensors and wherein the control portion estimates the initial temperature on the basis of the temperature signal outputted from the temperature sensor, which operates normally, in a case where a malfunction occurs at any one or more, but not all, of the temperature sensors.

5. The motor control device according to claim 1, wherein the motor is included in an actuator, which executes a switching operation of a drive switching mechanism.

6. The motor control device according to claim 5, wherein the drive switching mechanism is a mechanism for switching a driving state of the vehicle.

7. The motor control device according to claim 1 wherein, the temperature sensing device includes one of a temperature sensor for detecting an ambient temperature outside the vehicle, a temperature sensor for detecting a coolant temperature of the engine and a temperature sensor for detecting a temperature of an actuator, which executes a switching operation of a drive switching mechanism.

8. The motor control device according to claim 4, wherein the plurality of temperature sensors includes a temperature sensor for detecting an ambient temperature outside the vehicle, a temperature sensor for detecting a coolant temperature of the engine and a temperature sensor for detecting a temperature of an actuator, which executes a switching operation of a drive switching mechanism.

* * * * *